UNITED STATES PATENT OFFICE.

KARL ALBERT FREDRIK HIORTH, OF CHRISTIANIA, NORWAY.

METHOD OF REDUCING ORES.

934,170.     Specification of Letters Patent.     Patented Sept. 14, 1909.

No Drawing.     Application filed February 10, 1908. Serial No. 415,168.

*To all whom it may concern:*

Be it known that I, KARL ALBERT FREDRIK HIORTH, a subject of the King of Norway, residing at Christiania, Norway, have invented certain new and useful Improvements in the Method of Reducing Ores; and I do hereby declare the following to be a full, clear, and exact description of the invention, such as will enable others skilled in the art to which it appertains to make and use the same.

My invention relates to an improved method of reducing ores, especially iron ores.

In reducing ores in furnaces it has on account of the character of the process been necessary to make use of fuel, such as charcoal or a product of mineral coal as reduction agent. In electric furnaces there is no necessity for using a fuel as reduction agent, as the necessary temperature can be produced entirely by the electric current.

My invention consists in utilizing graphite rock as a reduction agent, in such cases where the necessary temperature is obtained by way of electricity.

Experiments have shown, that natural graphite rock (not pure graphite) contains in addition to silica, minerals of a basic nature which act as a flux and can to great advantage be utilized as a reduction agent. Graphite rock containing silica is found in large quantities but is valueless for a lead pencil or crucible material and therefore forming at present no valuable raw-material the refining of which would be remunerative. This graphite rock can be used in unrefined or in refined condition as a reduction agent for iron ore in electric furnaces. Not burning in air and not combining with the oxygen of the air until it is intensely red-hot, while it has a powerful reducing effect on iron ore electrically heated, such graphite is exceedingly fit for a reduction agent. Graphite rock of this kind melts and forms a flux together with the silica, and from this reason the process is a very simple and rapid one. Graphite in addition hereto is in itself an exceedingly pure carbon; and the kind of graphite hereinbefore particularly referred to can be had substantially free from sulfur and phosphorus which is not the case with any kind of mineral coal.

Experiments show that by using graphite as a reduction agent a very pure steel-like iron is obtained direct from the ore. Poor ores can thus in places where suitable fuel is expensive, be utilized (reduced) in an economic manner with the use of graphite as a reduction agent.

Claims.

1. The method of reducing ores which consists in mixing the ore with graphite rock containing silica and a basic material and subjecting the mixture to an electric current.

2. The method of reducing ores which consists in mixing iron ore with graphite rock containing silica and a basic material and heating the mixture by an electric current until the rock is completely fused.

In testimony that I claim the foregoing as my invention, I have signed my name in presence of two subscribing witnesses.

KARL ALBERT FREDRIK HIORTH.

Witnesses:
    HENRY BORDEWICH,
    AUG. OLSEN.